(12) United States Patent
Hasebe et al.

(10) Patent No.: US 7,540,534 B2
(45) Date of Patent: Jun. 2, 2009

(54) AIRBAG AND AIRBAG DEVICE

(75) Inventors: Masahiro Hasebe, Tokyo (JP);
Yukitoshi Narimoto, Tokyo (JP)

(73) Assignee: Takata Corporation, Tokyo (JP)

( * ) Notice: Subject to any disclaimer, the term of this patent is extended or adjusted under 35 U.S.C. 154(b) by 287 days.

(21) Appl. No.: 11/473,257

(22) Filed: Jun. 22, 2006

(65) Prior Publication Data
US 2006/0290112 A1 Dec. 28, 2006

(30) Foreign Application Priority Data
Jun. 24, 2005 (JP) ............................. 2005-185130

(51) Int. Cl.
*B60R 21/16* (2006.01)
(52) U.S. Cl. ................... 280/743.1; 280/743.2
(58) Field of Classification Search .............. 280/743.1, 280/743.2
See application file for complete search history.

(56) References Cited

U.S. PATENT DOCUMENTS

| | | | |
|---|---|---|---|
| 5,134,191 A | 7/1992 | Takarada et al. | |
| 5,213,361 A | 5/1993 | Satoh et al. | |
| 5,945,184 A | 8/1999 | Nagata et al. | |
| 6,595,549 B2 * | 7/2003 | Bohn et al. | 280/743.1 |
| 6,616,184 B2 * | 9/2003 | Fischer | 280/743.2 |
| 6,832,780 B2 * | 12/2004 | Amamori | 280/743.2 |
| 6,834,886 B2 | 12/2004 | Hasebe et al. | |
| 7,000,943 B2 | 2/2006 | Hasebe et al. | |
| 7,121,584 B2 * | 10/2006 | Hasebe et al. | 280/743.2 |
| 7,192,053 B2 * | 3/2007 | Thomas | 280/739 |
| 7,243,947 B2 * | 7/2007 | Bosch | 280/743.1 |
| 7,316,416 B2 * | 1/2008 | Hasebe et al. | 280/729 |

(Continued)

FOREIGN PATENT DOCUMENTS

EP     1 452 403 A1     9/2004

(Continued)

OTHER PUBLICATIONS

A search report dated Oct. 6, 2006, from the European Patent Office in corresponding European Application No. 06012162.1/2421

*Primary Examiner*—John Q. Nguyen
*Assistant Examiner*—Nicole Verley
(74) *Attorney, Agent, or Firm*—Fitch, Even, Tabin & Flannery

(57) ABSTRACT

An airbag and an airbag device are provided that include a left airbag section and a right airbag section which sufficiently absorbs shock when they receive an occupant. In one form, an airbag includes a left airbag section which is inflated at the left front side of an occupant, a right airbag section which is inflated at the right front side of the occupant, and a base-end chamber connecting one end of the left airbag section and one end of the right airbag section to each other. When the inflation of the airbag is completed, a connecting member connecting the left airbag section and the right airbag section is disposed at a height P, which is below a mid-point M of the left airbag section and the right airbag section in a vertical direction. When the airbag is in an inflated state, a vertical peripheral length of a left side of the left airbag section is shorter than a vertical peripheral length of a left outside panel adjacent the center of a vehicle body.

5 Claims, 7 Drawing Sheets

U.S. PATENT DOCUMENTS

| | | | |
|---|---|---|---|
| 7,370,880 B2 * | 5/2008 | Hasebe | 280/729 |
| 2003/0218325 A1 * | 11/2003 | Hasebe et al. | 280/743.2 |
| 2004/0145161 A1 | 7/2004 | Hasebe et al. | |
| 2004/0155440 A1 | 8/2004 | Hasebe et al. | |
| 2004/0195807 A1 * | 10/2004 | Hasebe et al. | 280/728.1 |
| 2004/0232681 A1 | 11/2004 | Adomeit | |
| 2005/0212275 A1 | 9/2005 | Hasebe | |
| 2006/0043707 A1 | 3/2006 | Hasebe et al. | |
| 2006/0066089 A1 | 3/2006 | Hasebe et al. | |

FOREIGN PATENT DOCUMENTS

| | | |
|---|---|---|
| EP | 1 580 083 A2 | 9/2005 |
| EP | 1 580 083 A3 | 5/2006 |
| JP | 49-23176 | 6/1974 |
| JP | 4-292239 | 10/1992 |
| JP | 10-71911 | 3/1998 |
| JP | 11020586 A | 1/1999 |

* cited by examiner

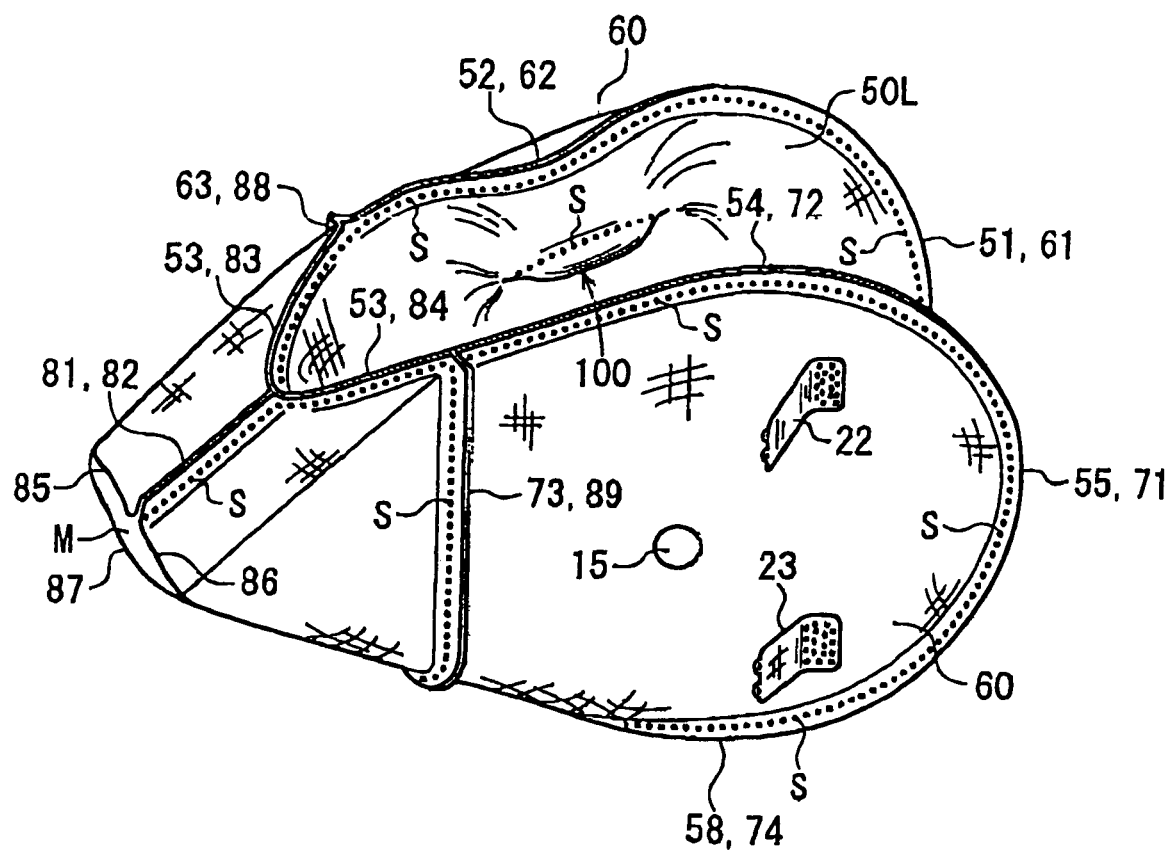

AIRBAG AND AIRBAG DEVICE

FIELD OF THE INVENTION

The present invention relates to an airbag and an airbag device for receiving an occupant in, for example, a vehicle collision. More specifically, it relates to an airbag and an airbag device including a left airbag section and a right airbag section which are inflated at the left front side and the right front side of the occupant, respectively.

BACKGROUND OF THE INVENTION

Japanese Unexamined Patent Application Publication No. 2004-268903 discloses, as an airbag which receives an occupant in, for example, a vehicle collision, an airbag including a left airbag section and a right airbag section which are inflated at the left front side and the right front side of an occupant, respectively, by a common inflator. According to this document, intermediate portions of the opposing surfaces of the left airbag section and the right airbag section in a front-back direction are connected by a connecting portion.

This airbag is folded and accommodated in a case and is covered with a cover. When an inflator (a gas generator) discharges gas in a vehicle collision, the airbag is inflated in front of the occupant as it pushes and opens the cover.

SUMMARY OF THE INVENTION

An object of the present invention is to provide an airbag and an airbag device including a left airbag section and a right airbag section which sufficiently absorb shock when they receive an occupant.

An airbag of the present invention in one form has an end side which is inflated away from a base end side of the airbag by discharge gas of an inflator disposed at the base end side. The airbag comprises a left airbag section which is inflated at a left front side of an occupant, and a right airbag section which is inflated at a right front side of the occupant. An end portion of the left airbag section at the end side and an end portion of the right airbag section at the end side are not connected to each other so that a gap extending towards the occupant is formed between the end portion of the left airbag section and the end portion of the right airbag section, when the airbag is in an inflated state. An intermediate portion of the left airbag section in the direction of inflation and an intermediate portion of the right airbag section in the direction of inflation are connected to each other by a connecting portion. The connecting portion is disposed below a mid-point of the left airbag section and the right airbag section in a vertical direction.

The airbag in a second form is a passenger airbag. Each of the left airbag section and the right airbag section is provided with a width restricting tether for restricting a horizontal width of its associated airbag section during the inflation. In at least one of the left airbag section and the right airbag section that is disposed adjacent the center of a body of a vehicle, the width restricting tether pulls an upper portion of the airbag section facing the center of the vehicle body in an inward and a downward direction of the airbag section.

In the airbag in a third form, in at least the airbag section that is disposed adjacent the center of the vehicle, a portion thereof facing the left airbag section is formed by an inside panel and a portion thereof opposite to the portion facing the left airbag section is formed by an outside panel. In addition, the inside panel and the outside panel are such that their upper sides are connected to each other, their lower sides are connected to each other, and edges disposed at the end side in the direction of inflation are connected to each other. Further, when the airbag section that is disposed adjacent the center of the vehicle is in an inflated state, a vertical peripheral length of the inside panel is less than a vertical peripheral length of the outside panel.

In the airbag in a fourth form, the vertical peripheral length of the inside panel is reduced by pinching and sewing an intermediate portion in the vertical direction of the inside panel of the airbag section that is disposed adjacent the center of the vehicle. In addition, when the inside panel and the outside panel are flatly spread out without the pinched-and-sewed portion, a vertical length of the inside panel and a vertical length of the outside panel are substantially equal to each other.

An airbag device of the present invention in a fifth form comprises any one of the above-described airbag, and an inflator which inflates the airbag.

In the present invention, an end portion of the left airbag section at the end side and an end portion of the right airbag section at the end side are not connected to each other so that a gap extending towards an occupant is formed between the end of the left airbag section and the end of the right airbag section, when the airbag is in an inflated state.

The inflated left airbag section receives the left portion of the occupant's chest, and the inflated right airbag section receives the right portion of the occupant's chest. Strong, hard rib-bones exist in the left and right portions of the chest. The airbag receives the occupant through the rib-bones, and absorbs shock. When this airbag is in an inflated state, a gap exists between the end of the left airbag section and the end of the right airbag section, and the vicinity of the breastbone at the central portion of the occupant's chest faces the gap. Therefore, when the body of the occupant is pushed into the airbag, the vicinity of the breastbone of the chest does not receive a very large reaction force from the airbag, thereby reducing the load that is exerted upon the vicinity of the breastbone.

When the occupant is received by the airbag in this way, for example, the chest and the shoulders of the occupant move forward so as to compress the end side of the left airbag section and the end side of the right airbag section. Here, the shock of the head is absorbed as a result of the head of the occupant moving into a portion between the left airbag section and the right airbag section.

In the present invention, the connecting portion connecting the left airbag section and the right airbag section is disposed below a mid-point of the left airbag section and the right airbag section in a vertical direction. Therefore, if the vehicle speed is high during a collision, even after, for example, the chest and the shoulders of the occupant have reached the vicinity of the connecting portion, the head of the occupant moves into the portion between the left airbag section and the right airbag section so as to be positioned forwardly of the vicinity of the connecting portion, as a result of which the shock of the head is absorbed.

According to the airbag in the second form, since the horizontal width of each inflated airbag section is restricted by a tether, even if an inflator having a small capacity is used, the left airbag section and the right airbag section are sufficiently inflated quickly. In the airbag section adjacent the center of the vehicle body, an upper portion of the airbag section facing the center of the vehicle body is pulled by the tether in an inward direction and a downward direction of the airbag section, thereby bringing it closer to the airbag section adjacent a door. Therefore, the distance between the upper portion of the left airbag section and the upper portion of the right airbag section is reduced, thereby increasing the amount of shock absorption of the occupant's head that is received by the airbag so that the head moves into the portion between the upper portion of the left airbag section and the upper portion of the right airbag section.

The airbag section adjacent the center of the vehicle in the airbag in the third form is such that a vertical peripheral length of the inside panel when the airbag is inflated is less than a vertical peripheral length of the outside panel when the airbag is inflated. Therefore, the upper portion of the airbag section adjacent the center of the vehicle is inflated so as to approach the airbag section adjacent the door. As a result, the amount of shock absorption of the occupant's head that is received by the airbag so that the head moves into the portion between the upper portions of the airbag sections is increased.

In order to make the vertical peripheral length of the inside panel when it is inflated shorter than the vertical peripheral length of the outside panel, it is desirable to use an airbag in which a vertical length of the inside panel before inflation is shorter than a vertical length of the outside panel.

In this case, as in the fourth form, the vertical peripheral length of the inside panel is made shorter by pinching and sewing an intermediate portion in the vertical direction of the inside panel. When the inside panel and the outside panel are flatly spread out without the pinched-and-sewed portion, it is desirable that the vertical length of the inside panel and the vertical length of the outside panel be substantially equal to each other.

When the inside panel prior to pinching and sewing the inside panel is placed upon the outside panel and peripheral edges of these panels are then sewed together, "two-dimensional sewing" in which the panels are flatly spread out, placed upon each other, and sewed together is carried out, so that the sewing is simple. The vertical length of the inside panel is reduced by pinching and sewing the inside panel after sewing the peripheral edges of the panels to each other.

In the airbag of the present invention, since an intermediate portion of the left airbag section in the inflation direction and an intermediate portion of the right airbag section in the inflation direction are connected to each other, even if the inflation of one of the airbag sections lags behind when the airbag is being inflated, the airbag section that is being inflated faster pulls the airbag section whose inflation is lagging behind and accelerates the inflation of this airbag section. Moreover, since the intermediate portion of the left airbag section in the inflation direction and the intermediate portion of the right airbag section in the inflation direction are connected to each other, the airbag section of which inflation has been started earlier starts to pull in the inflation direction the airbag section of which inflation is lagging behind at an initial stage of the inflation where the airbag section is inflated to the intermediate portion. This causes the left airbag section and the right airbag section to be inflated, for example, smoothly and substantially uniformly at the initial stage of inflation.

BRIEF DESCRIPTION OF THE DRAWINGS

FIG. 5 is a perspective view of the airbag shown in FIG. 1 being produced by sewing (after the pinch sewing).

DETAILED DESCRIPTION OF THE PREFERRED EMBODIMENTS

An embodiment of the present invention will hereunder be described with reference to the drawings.

Figure 1:
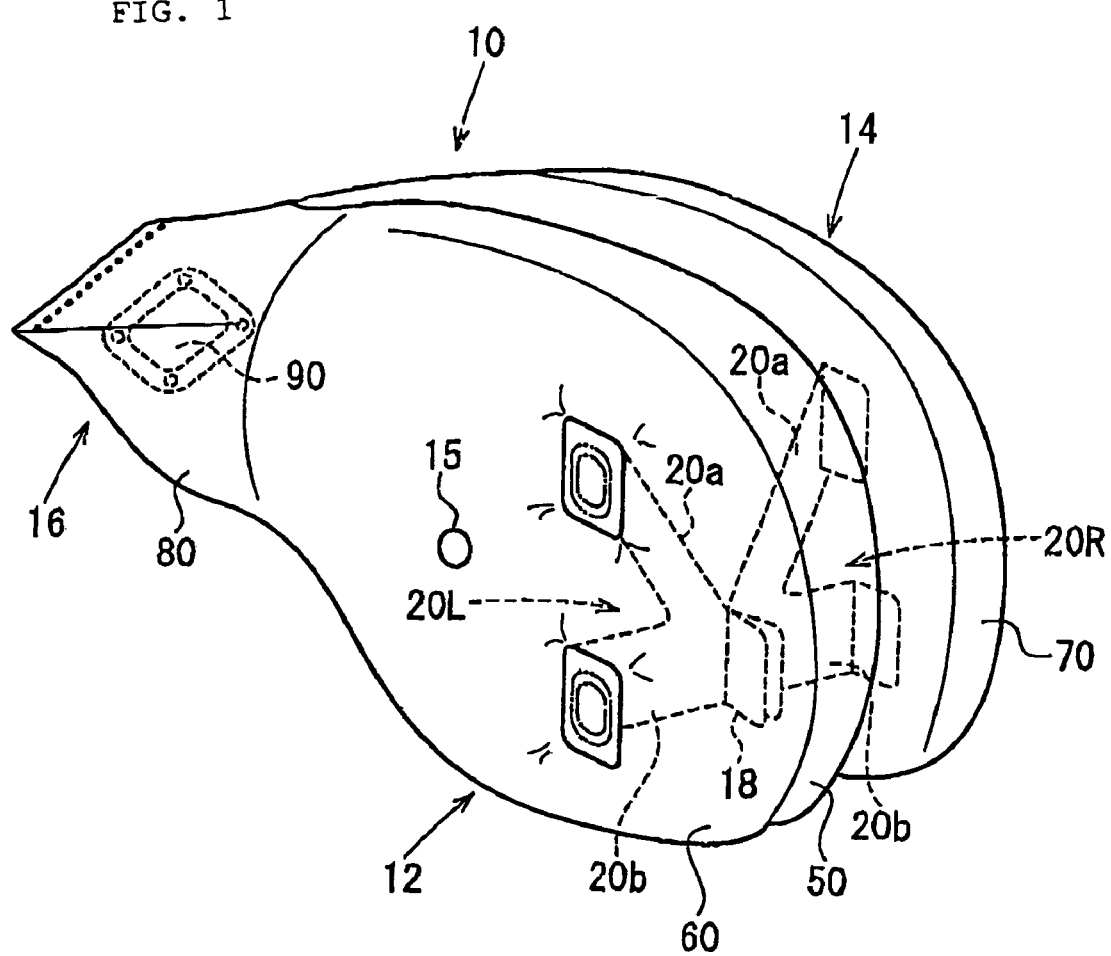
FIG. 1 is a perspective view of an airbag of an embodiment of the present invention.
Figure 2:
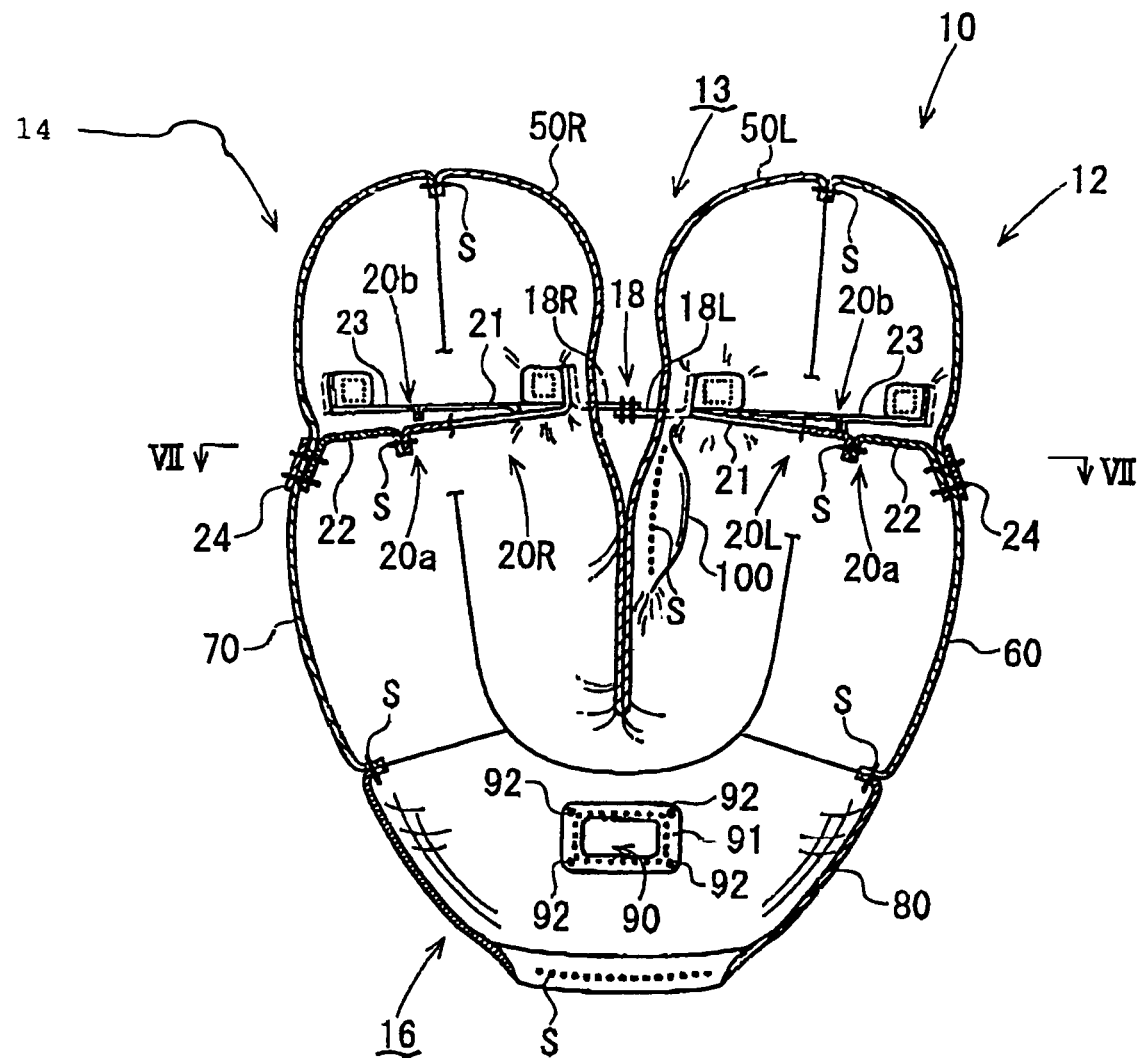
FIG. 2 is a perspective view of the airbag shown in FIG. 1.
Figure 3:
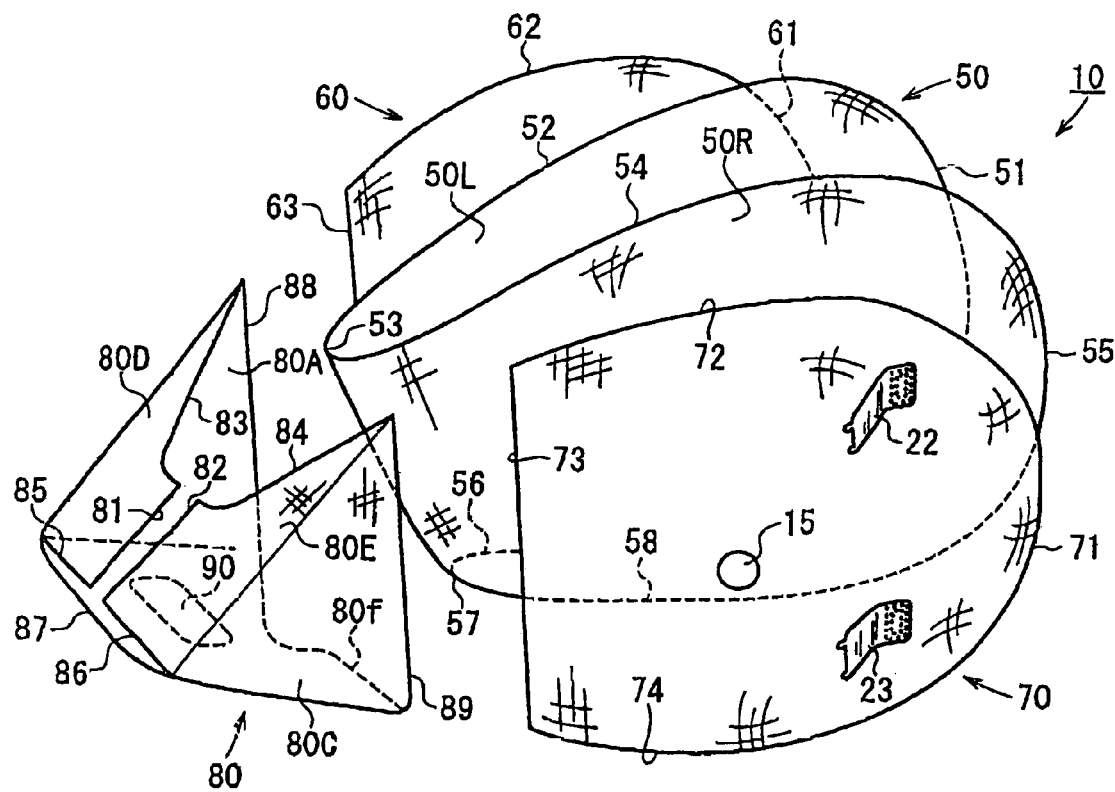
FIG. 3 is an exploded perspective view of a panel structure of the airbag shown in FIG. 1.
Figure 4:
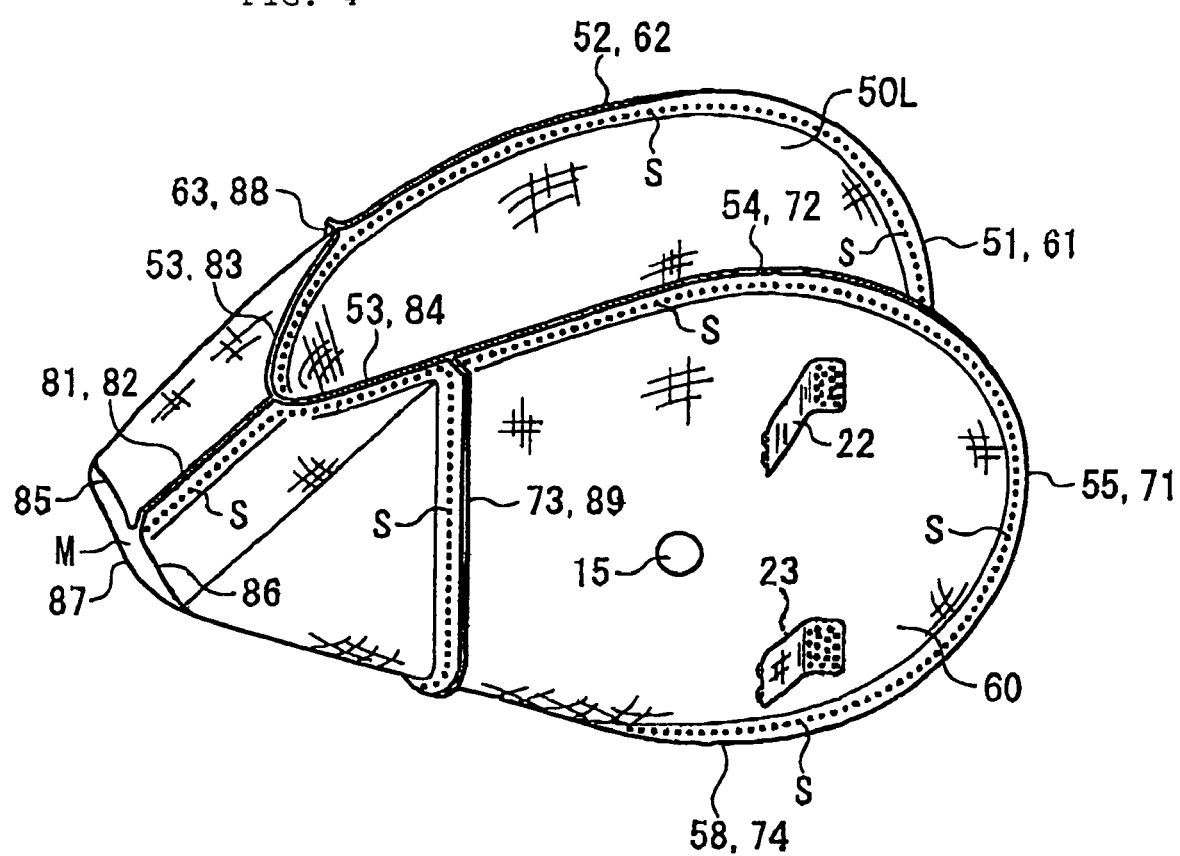
FIG. 4 is a perspective view of the airbag shown in FIG. 1 being produced by sewing (prior to pinch sewing).
Figure 6A:
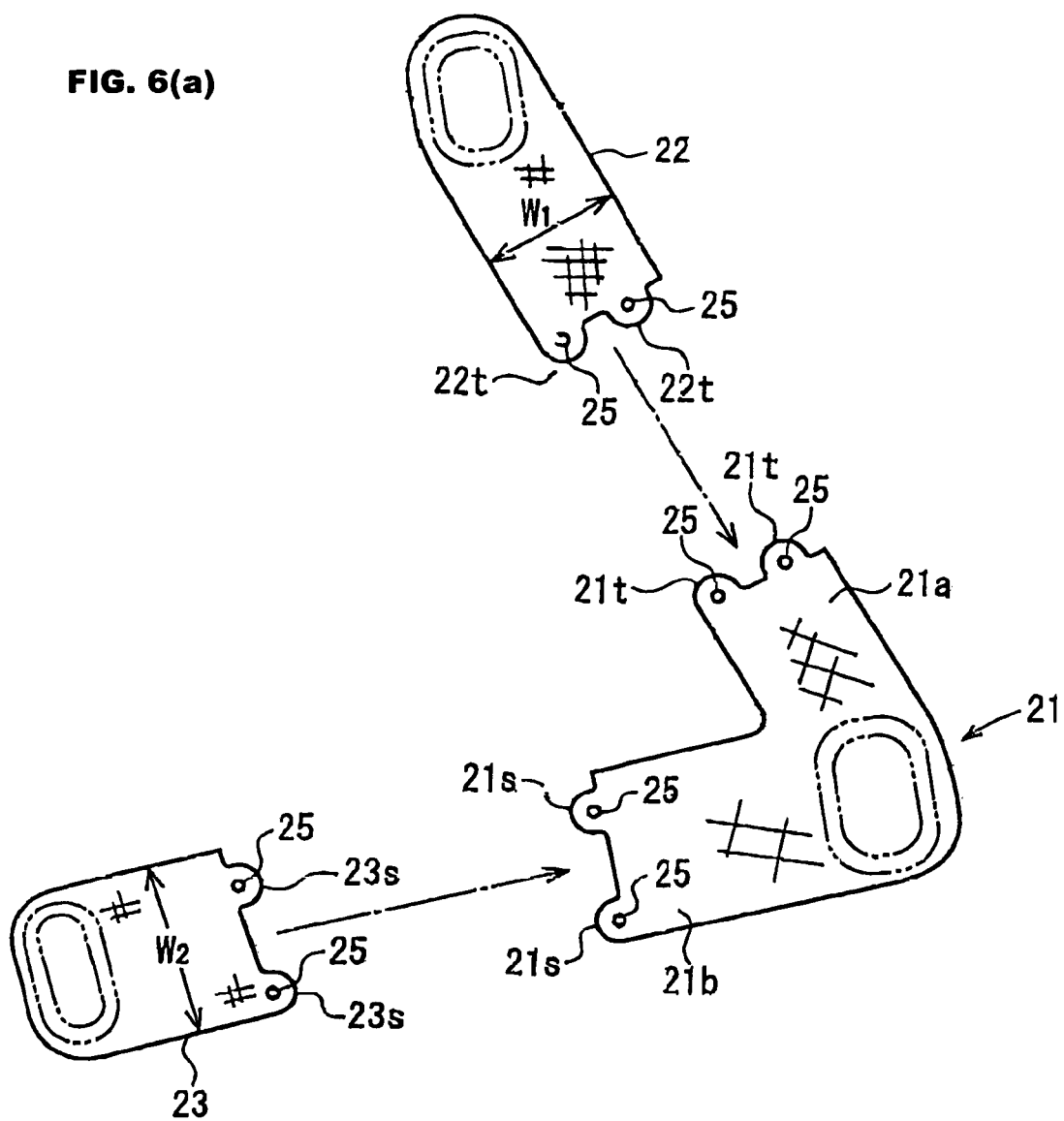
FIG. 6(a) is an exploded view of a tether for restricting the width of the airbag.
Figure 6B:
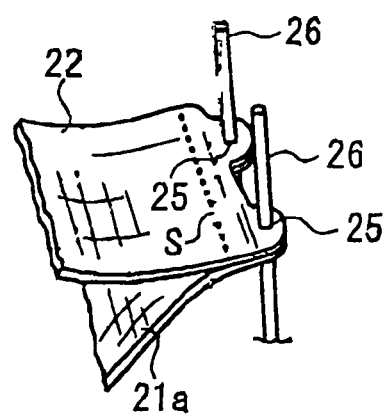
FIG. 6(b) is a perspective view of a main portion illustrating a method of joining of tether sections.
Figure 7:
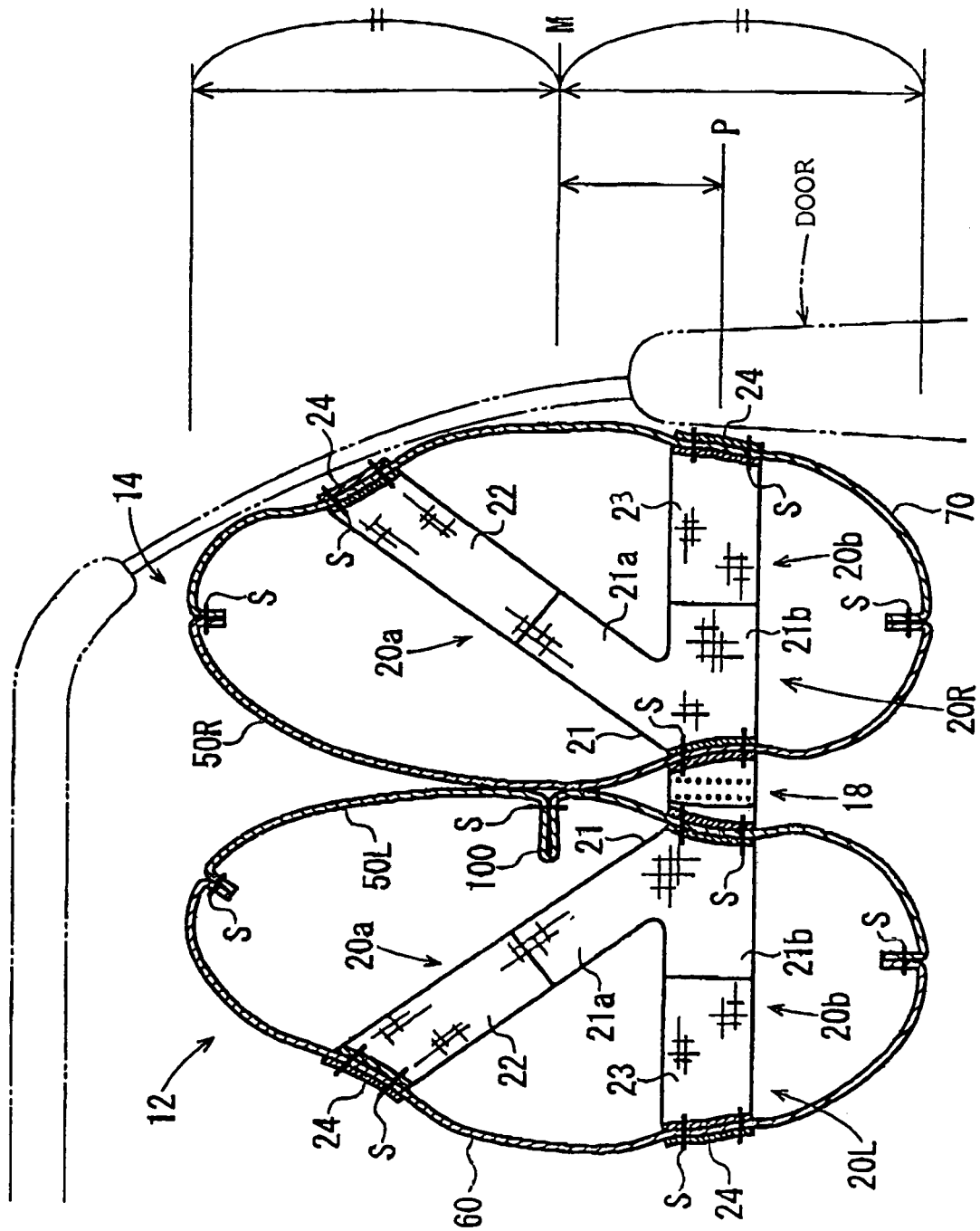
FIG. 7 is a sectional view taken along line VII-VII of FIG. 2.

FIG. 1 is a perspective view of an airbag of an embodiment of the present invention. FIG. 2 is a horizontal sectional view of the airbag. FIG. 3 is an exploded perspective view of a panel structure of the airbag. FIG. 4 is a perspective view showing the airbag being produced by sewing (prior to "pinch sewing"). FIG. 5 is a perspective view showing the airbag being produced by sewing (after the "pinch sewing"). FIG. 6(a) is an exploded view of a width restricting tether for restricting the width of the airbag and FIG. 6(b) is a perspective view of a main portion illustrating a method of joining tether sections. FIG. 7 is a sectional view taken along line VII-VII of FIG. 2.

In this embodiment, an airbag 10 is an airbag of a passenger airbag device that is disposed at an instrument panel of an automobile whose right front seat is a passenger seat. A left airbag section and a right airbag section may hereafter be simply called "bag sections."

The airbag 10 includes a left airbag section 12 which is inflated at the left front side of an occupant (at a side of the center of a vehicle body in this embodiment), a right airbag section 14 which is inflated at the right front side of the occupant (at a side of a door), and a communicating portion 16 communicating one end of the left airbag section 12 with one of the right airbag section 14. The communicating portion 16 is a base end of the airbag 10. The bag sections 12 and 14 are inflated away from the communicating portion 16. An outer peripheral surface of each of the bag sections 12 and 14 is provided with a vent hole 15.

When the airbag 10 is in an inflated state, a bridging member, such as a tie panel, does not exist between an end portion of the left airbag section 12 and an end portion of the right airbag section 14, as a result of which a gap 13 (see FIG. 2) is formed between the end portions of the bag sections 12 and 14. The gap 13 extends towards the occupant (that is, upward in FIG. 2).

When the inflation of the airbag 10 is completed, the distance between an endmost portion of the left airbag section 12 and an endmost portion of the right airbag section 14 is preferably from 150 mm to 450 mm, and, more preferably, from 170 mm to 430 mm.

A horizontal distance between these endmost portions and a deepest portion of the gap 13 is preferably from 280 mm to 480 mm, and more preferably from 310 mm to 450 mm. The bag sections 12 and 14 are connected to each other by a connecting member 18 at an intermediate portion between the endmost portion of one of the bag sections 12 and 14 and the deepest portion and an intermediate portion between the endmost portion of the other of the bag sections 12 and 14 and the deepest portion. In the embodiment, the connecting member 18 comprises a left connecting member portion 18L and a right connecting member portion 18R. As shown in FIG. 7, when the inflation of the airbag 10 is completed, the connecting member 18 is disposed at a height P, which is below a mid-point M of the left airbag section 12 and the right airbag section 14 in the vertical direction.

In the present invention, when the inflation of the airbag 10 is completed, the height P of the portion where the left airbag section 12 and the right airbag section 14 are connected to each other by the connecting member 18 is preferably 20 mm to 150 mm, and more preferably 30 mm to 140 mm below the mid-point M of the left airbag section 12 and the right airbag section 14 in the vertical direction.

When the inflation of the airbag 10 is completed, the portion where the left airbag section 12 and the right airbag section 14 are connected to each other is positioned in the gap 13 preferably at 50 mm to 250 mm, and more preferably at 70 mm to 230 mm from the endmost portions of the bag sections 12 and 14.

Width restricting tethers 20L and 20R for restricting horizontal widths of the respective bag sections when they are being inflated are disposed in the respective bag sections 12 and 14. Each of the width restricting tethers 20L and 20R has an oblique tether portion 20a and a horizontal tether portion 20b. In a vertical sectional plane extending in a direction intersecting a front-back direction of each of the inflated bag sections 12 and 14, each oblique tether portion 20a extends obliquely and each horizontal tether portion 20b extends sideways (substantially horizontally).

In the width restricting tether 20L of the left airbag section 12 that is positioned adjacent the center of the vehicle body when the airbag is inflated, the oblique tether portion 20a connects an upper portion of the bag section 12 facing the center of the vehicle body (that is, a left outside panel 60 (described later)) to a lower portion of the bag section 12 opposing the bag section 14 (that is, a left side 50L of an inside panel 50 (described later)). The horizontal tether portion 20b of the tether 20L connects a lower portion of the bag section 12 facing the center of the vehicle body (that is the left outside panel 60) to the lower portion of the bag section 12 opposing the bag section 14 (that is the left side 50L).

In the width restricting tether 20R of the right airbag section 14 that is positioned adjacent the door when the airbag is inflated, the oblique tether portion 20a connects an upper portion of the bag section 14 facing the door (that is a right outside panel 70 (described later)) to a lower portion of the bag section 14 opposing the bag section 12 (that is a right side 5OR of the inside panel 50 (described later)). The horizontal tether portion 20b of the tether 20R connects a lower portion of the bag section 14 facing the door (that is the right outside panel 70) to the lower portion of the bag section 14 opposing the bag section 12 (that is the right side 50R).

In the embodiment, the horizontal tether portions 20b are disposed at substantially the same height as the height P at which the connecting member 18 is disposed. When the airbag 10 is in an inflated state, the horizontal tether portions 20b of the respective tethers 20L and 20R and the connecting member 18 extend substantially horizontally in a substantially straight line.

In the tether 20R of the right airbag section 14 which is inflated at the door side, an end portion of the oblique tether portion 20a adjacent the right outside panel 70 is preferably connected to an inner side of a portion of the right outside panel 70 overlapping an A pillar of the vehicle body when the airbag is inflated.

In the tether 20L of the left airbag section 12 which is inflated adjacent the center of the vehicle body, an end portion of the oblique tether portion 20a adjacent the left outside panel 60 is preferably connected to an inner side of a portion of the left outside panel 60 that is disposed at substantially the same height as the connection portion of the right outside panel 70 with the oblique tether portion 20a of the tether 20R of the right airbag section 14 when the airbag is inflated.

In this embodiment, the left side 50L of the left airbag section 12 disposed adjacent the center of the vehicle is provided with a pinched-and-sewed portion 100. Accordingly, when the airbag 10 is in an inflated state, a vertical peripheral length of the left side 50L of the left airbag section 12 is less than a vertical peripheral length of the left side panel 60 of the left airbag section 12 adjacent to the center of the vehicle body.

The panel structure, etc., of the airbag 10 including the pinched-and-sewed portion will hereunder be described in more detail. In the description below, a front (end) side of each panel refers to the front side of the airbag 10 in a direction of inflation, and a rear side of each panel refers to a base end side in the direction of inflation.

The airbag 10 comprises a total of four panels, the inside panel 50, the left outside panel 60, the right outside panel 70, and a base-end panel 80. The left connecting member portion 18L and the right connecting member portion 18R are connected to the inside panel 50.

The inside panel 50 is an elongated panel substantially having the shape of a gourd, with the left side 50L and the right side 50R being formed by folding the panel in two at the center. The left side 50L of the inside panel 50 forms an inner surface of the left airbag section 12, and the right side 50R of the inside panel 50 forms an inner surface of the right airbag section 14. The entire periphery of the inside panel 50 is formed by a lower side 56, a front end side 51, and an upper side 52 of the left side 50L, and an upper side 54, a front end side 55, and a lower side 58 of the right side 50R. The upper side 53 and the lower side 57 are disposed near the folded portion forming the deepest portion between the sides of the airbag.

The entire periphery of the left outside panel 60 and the entire periphery of the right outside panel 70 are formed by respective front end sides 61 and 71, respective upper sides 62 and 72, respective linear rear sides 63 and 73, and respective lower sides 64 and 74 (the lower side 64 is not shown).

In this embodiment, a vertical width of the left outside panel 60 and a vertical width of the left side 50L when they are flatly spread out are substantially equal to each other. When the flatly spread out left outside panel 60 and the left side 50L are placed upon each other, the upper sides 62 and 52, the front end sides 61 and 51, and the lower sides 64 and 56 are superimposed upon each other, so that peripheral edges thereof can be sewed together by two-dimensional sewing.

In the embodiment, in the right airbag section 14, a vertical width of the right outside panel 70 and a vertical width of the right side 50R of the inside panel 50 when they are flatly spread out are substantially equal to each other.

The base-end panel 80 has a left side surface 80A, a bottom surface 80B, a right side surface 80C, a left flap 80D forming an upper left side, and a right flap 80E forming an upper right side. The base-end panel 80 is folded so that the side surfaces 80A and 80C are substantially triangular, and its side facing the front side of the airbag is open.

The entire periphery of the base-end panel 80 is formed by opposing sides 81 and 82 of the substantially rectangular flaps 80D and 80E, front sides (flap front sides) 83 and 84 of the flaps 80D and 80E, rear sides 85 and 86 of the flaps 80D and 80E, a rear side 87 opposing the rear sides 85 and 86, front sides (side surface front sides) 88 and 89 of the respective side surfaces 80A and 80C, and a front side 80f at the bottom portion connecting the side surface front sides 88 and 89.

As shown in FIG. 2, the bottom portion 80B of the base-end panel 80 is provided with a gas inlet 90. A frame-shaped reinforcing cloth 91 is superimposed upon the gas inlet 90 so as to surround the gas inlet 90 and is sewed thereto. The gas inlet 90 is rectangular, and has bolt insertion holes 92 near the four corners.

As shown in FIG. 6(b), in this embodiment, the tethers 20L and 20R each comprise three tether sections (panels) 21, 22, and 23. As illustrated, each tether section 21 is a substantially V-shaped panel that is divided in two at a forked portion. One of the divided portions corresponds to an oblique tether structural portion 21 a that forms the inside panel 50 side of the oblique tether portion 20a, and the other divided portion corresponds to a horizontal tether structural portion 21b forming the inside panel 50 side of the horizontal tether portion 20b. Each V-shaped tether section 21 has its base end of the forked portion sewed to the inside surface of the inside panel 50.

In this embodiment, the base end of each tether section 21 is positioned so as to overlap one end of its associated connecting member portion 18L or 18R from the inner side of its associated bag section 12 or 14 with the inside panel 50 being disposed therebetween. Each tether section 21 functions as a reinforcing cloth for sewing its associated connecting member portion 18L or 18R and the inside panel 50 to each other, and each of the connecting member portions 18L and 18R serves as a reinforcing cloth for sewing the inside panel 50 and its associated tether section 21 to each other.

The remaining tether sections 22 form the outside panel 60 side and the outside panel 70 side of the respective oblique tether portions 20a, and the remaining tether sections 23 form the outside panel 60 side and the outside panel 70 side of the respective horizontal tether portions 20b. An end of one of the tether sections 22 and an end of the other tether section 22 are sewed to an inside surface of the outside panel 60 and to an inside surface of the outside panel 70, respectively, so as to be positioned above the mid-point of the outside panel 60 and the mid-point of the outside panel 70 in the vertical direction, respectively. An end of one of the tether sections 23 and an end of the other tether section 23 are sewed to the inside surface of the outside panel 60 and to the inside surface of the outside panel 70, respectively, so as to be positioned below the mid-point of the outside panel 60 and the mid-point of the outside panel 70 in the vertical direction, respectively. Reference numerals 24 denote reinforcing cloths that are disposed opposite to the aforementioned ends of the tether sections 22 and 23 and are sewed with them with the respective outside panels 60 and 70 being disposed therebetween.

An end of each oblique tether structural portion 21a is provided with two ear-shaped protrusions 21t. An end of each horizontal tether structural portion 21b is provided with two ear-shaped protrusions 21s. The other end of each tether section 22 is provided with two ear-shaped protrusions 22t. The other end of each tether section 23 is provided with two ear-shaped protrusions 23s. The protrusions 21t, 21s, 22t, and 23s are provided with insertion holes 25 for inserting jigs for carrying out easily and precisely sewing of the oblique tether structural portions 21a and the tether sections 22 and sewing of the horizontal tether structural portions 21b and the tether sections 23. The distance between the protrusions 21t and 21t and the distance between the protrusions 22t and 22t are the same. The distance between the protrusions 21s and 21s and the distance between the protrusions 23s and 23s are the same.

When sewing the tether structural portions and the tether sections, such as when sewing the oblique structural portion 21a and the tether section 22, as shown in FIG. 6(b), after placing one end of the oblique tether structural portion 21a and the other end of the tether section 22 upon each other, jigs 26 are inserted through the insertion holes 25 and 25 of the superimposed ends, and the ends are sewed together so that they are not displaced from each other. The horizontal tether structural portion 21b and the tether section 23 are also sewed together in the same way.

In the embodiment, a width $W_1$ of the oblique tether structural portion 21a of each oblique tether portion 20a and a width $W_1$ of each tether section 22 are equal to each other. A width $W_2$ of the horizontal tether structural portion 21b of each horizontal tether portion 20b and a width $W_2$ of each tether section 23 are equal to each other. The distance between the protrusions 21t and 21t is less than the distance between the protrusions 21s and 21s.

By making the widths $W_1$ and $W_2$ different and by making the distance between the protrusions 21s and the distance between the protrusions 21t different, it is possible to prevent the tether sections 22 from being accidentally connected to the horizontal tether structural portions 21b. Similarly, it is possible to prevent the tether sections 23 from being accidentally connected to the oblique tether structural portions 21a.

In this embodiment, one of the two protrusions 21t is disposed along a side of the tether structural portion, one of the two protrusions 21s is disposed along a side of the tether structural portion, one of the two protrusions 22t is disposed along a side of the tether section, and one of the two protrusions 23s is disposed along a side of the tether section. The other protrusion 21t is disposed in a portion of the end of the tether structural portion in the widthwise direction, the other protrusion 21s is disposed in a portion of the end of the tether structural portion in the widthwise direction, the other protrusion 22t is disposed in a portion of the end of the tether section in the widthwise direction, and the other protrusion 23s is disposed in a portion of the end of the tether section in the widthwise direction. When connecting the oblique tether structural portion 21a and the tether section 22 to each other or when linking the horizontal tether structural portion 21b and the tether section 23 to each other, they are aligned so that their sides extend in straight lines. If either one of the tether structural portion and the tether section is reversed, the sides of the tether structural portion and the sides of the tether section are not disposed in correspondence with each other and are, thus, not aligned in straight lines. Therefore, it is possible to immediately know that either one of the tether structural portion and the tether section is reversed.

Consequently, according to the embodiment, it is possible to sew the tether structural portion and the tether section by properly aligning them, that is, without twisting them.

In producing this airbag 10, the rear side 63 of the left outside panel 60 and the rear side 73 of the right outside panel 70 are, respectively, sewed to the side surface front sides 88 and 89 of the base-end panel 80 that is flatly spread out. Then, the opposing sides 81 and 82 of the respective flaps 80D and 80E of the base-end panel 80 are sewed together.

Next, the left outside panel 60 and the left side 50L of the inside panel 50 that are flatly spread out are made to face each other, and the front end sides 51 and 61 are sewed together, the upper sides 52 and 62 are sewed together, and the lower sides 56 and 64 are sewed together. In addition, the right outside panel 70 and the right side 50R of the inside panel 50 are made to face each other, and the front end sides 55 and 71 are sewed together, the upper sides 54 and 72 are sewed together, and the lower sides 58 and 74 are sewed together. The flap front sides 83 and 84 of the base-end panel 80 are sewed to the vicinity of the upper side 53 disposed near the folded portion of the inside panel 50, and the front side 80f at the bottom portion of the base-end panel 80 is sewed to the vicinity of the lower side 57 disposed near the folded portion.

Next, the end of the oblique tether structural portion 21a and the end of the horizontal tether structural portion 21b of the tether section 21 mounted to the left side 50L of the inside panel 50 are sewed to the other ends of the respective tether sections 22 and 23 mounted to the upper and lower portions of the left outside panel 60, respectively. The end of the oblique tether structural portion 21a and the end of the horizontal tether structural portion 21b of the tether section 21 mounted to the right side 50R of the inside panel 50 are sewed to the other ends of the respective tether sections 22 and 23 mounted to the right outside panel 70.

By sewing the tether sections 21 to 23 to each other, the left side 50L and the left outside panel 60 are connected to each other through the tether 20L. The right side 50R and the right outside panel 70 are connected to each other through the tether 20R.

By sewing them, as shown in FIG. 4, the inner and outer sides of the airbag 10 are reversed compared to the airbag 10 shown in FIG. 1, that is, the sewed portions are exposed at the outer side of the airbag. However, as shown in FIG. 4, the flap rear sides 85 and 86 and the rear side 87 of the base-end panel 80 are not sewed yet, so that, in this state, there is an opening M. In addition, in this state, a vertical length of the left outside panel 60 and a vertical length of the left side 50L are substantially equal to each other.

As shown in FIGS. 4 and 5, an intermediate portion of the left side 50L in the vertical direction (in this embodiment, near the mid-point of the left side 50L in the front-back direction and near the mid-point of the left side 50L in the vertical direction) is pinched outwardly of an intermediate sewed airbag product, and is sewed at its base, that is, is subjected to what is called "pinch sewing," thereby making the vertical length of the left side 50L less than the vertical length of the left outside panel 60 by a predetermined amount. Reference numeral 100 denotes the pinched-and-sewed portion.

Thereafter, the inner and outer sides of the airbag are reversed through the opening M. Then, the sides defining the opening M are sewed together, and the connecting member portions 18L and 18R are sewed together, thereby forming the airbag 10 shown in FIG. 1.

Although not shown, the airbag 10 is folded and accommodated in a case (container), a mounting plate is superimposed upon edges defining the gas inlet 90, and bolts implanted in the mounting plate are inserted into the bolt insertion holes 92. By fastening the bolts to the case (container) with nuts, the airbag 10 is connected to the case. By mounting a lid to the case so as to cover the folded airbag 10, an airbag device is formed. The lid is such as to be cleaved by pressing force of the airbag 10 when the airbag 10 is inflated.

This airbag device is installed in an airbag device setting opening disposed at the upper surface of an instrument panel provided in front of a passenger seat of an automobile.

In the airbag device, an inflator (not shown) discharges gas in a vehicle collision. The gas from the inflator passes through the gas inlet 90 and is introduced into the base-end chamber 16 in the airbag, thereby inflating the base-end chamber 16 first. Then, the gas moves into the left airbag section 12 and the right airbag section 14 to inflate these airbag sections.

In the airbag 10, the base-end chamber 16 that has been inflated first comes into contact with the instrument panel and its posture is stabilized. Therefore, the postures of the left airbag section 12 and the right airbag section 14 are stabilized not only when the inflation is completed but also when they are being inflated.

Since the gas is substantially uniformly supplied to the left airbag section 12 and the right airbag section 14 from the inflated base-end chamber 16, both the left airbag section 12 and the right airbag section 14 are smoothly and substantially uniformly inflated from the initial stage of the inflation.

When the inflation of the airbag 10 is completed, the depression-like gap 13 is formed between the end portion of the left airbag section 12 and the end portion of the right airbag section 14 so as to extend towards an occupant. The inflated left airbag section 12 receives the left chest of the occupant and the inflated right airbag section 14 receives the right chest of the occupant, so that the vicinity of the breastbone faces the gap 13. Therefore, the reaction force that is exerted upon the vicinity of the breastbone when the airbag receives the chest is small.

When the occupant is received by the airbag 10 in this way, for example, the chest and the shoulders of the occupant move forward so as to compress the end portion of the left airbag section 12 and the end portion of the right airbag section 14. Here, the shock of the head of the occupant is absorbed as a result of the head of the occupant moving into the gap 13 between the left airbag section 12 and the right airbag section 14. In the present invention, the connecting member 18 connecting the left airbag section 12 and the right airbag section 14 is disposed below the mid-point of the left airbag section 12 and the right airbag section 14 in the vertical direction. Therefore, if the vehicle speed is high during a collision, even after, for example, the chest and the shoulders of the occupant have reached the vicinity of the connecting member 18, the head of the occupant moves into the portion between the left airbag section 12 and the right airbag section 14 so as to be positioned forwardly of the vicinity of the connecting member 18, as a result of which the shock of the head is absorbed.

In this embodiment, because the horizontal widths of the left airbag section 12 and the right airbag section 14 when they are inflated are restricted by the width restricting belts 20L and 20R, respectively, the internal capacities of the left airbag section 12 and the right airbag section 14 are relatively small. Therefore, even if an inflator having a small capacity is used, the left airbag section 12 and the right airbag section 14 are sufficiently inflated quickly.

The upper portion of the left airbag section 12 that is disposed adjacent the center of the vehicle body is pulled in an inward direction and a downward direction of the airbag section by the oblique tether portion 20a of the tether 20L, thereby bringing it closer to the right airbag section 14 disposed adjacent the door. Therefore, the distance between the upper portion of the left airbag section 12 and the upper portion of the right airbag section 14 is reduced, thereby increasing the amount of absorption of shock of the occupant's head that is received by the airbag 10 as a result of the head moving into the portion between the upper portion of the left airbag section 12 and the upper portion of the right airbag section 14.

Further, in this embodiment, the vertical peripheral length of the left side 50L (forming the surface of the left airbag section 12 facing the right airbag section 14) when the left side 50L is inflated is less than the vertical peripheral length of the left outside panel 60 (forming the surface of the bag section 12 facing the center of the vehicle body) when the left outside panel 60 is inflated. Therefore, the left airbag section 12 is inflated so that its upper portion approaches the right airbag section 14 adjacent the door. As a result, the amount of absorption of shock of the occupant's head that is received by the airbag 10 so that the head moves into the portion between the upper portion of the left airbag section 12 and the upper portion of the right airbag section 14 is further increased.

In the embodiment, by pinching and sewing an intermediate portion of the left side 50L in the vertical direction, the vertical peripheral length of the left side 50L is reduced. When the left side 50L and the outside panel 60 are flatly spread out without the pinched-and-sewed portion, the vertical length of the left side 50L and the vertical length of the outside panel 60 are substantially equal to each other. Therefore, when the left side 50L prior to the pinch sewing is placed upon the outside panel 60 and their peripheral edges are sewed together, two-dimensional sewing in which the panels 50L and 60 are flatly spread out, placed upon each other, and sewed together is carried out, so that the sewing is simple. By forming the pinched-and-sewed portion 100 after completing the sewing of the peripheral edges of the panels, the vertical length of the left side 50L is reduced.

In the embodiment, even for the right airbag section 14 adjacent the door, its upper portion facing the door is pulled in an inward direction and a downward direction of the airbag section by the oblique tether portion 20a of the tether 20R. Therefore, as shown in FIG. 7, the upper portion of the right airbag section 14 adjacent the vehicle body does not interfere with, for example, an A pillar or a windshield or a side door in the vicinity of the A pillar.

The above-described embodiment is only one form of the present invention, so that the present invention is not limited to the above-described embodiment.

For example, the positions, the directions of extension, and the number of width restricting tethers of the airbag sections may be different from those in the above-described embodiment.

Although, in the embodiment, the airbag 10 comprises a total of four panels, the inside panel 50, the left outside panel 60, the right outside panel 70, and the base-end panel 80, the panel structure of the airbag of the present invention is not limited thereto. For example, the inside panel forming the opposing surfaces of the left airbag section and the right airbag section and the outside panels forming the outer surfaces disposed opposite to the opposing surfaces of the left airbag section and the right airbag section may be separately formed as in the embodiment or they may be formed as a single panel.

The present invention may be applied to a seat airbag and an airbag device for a seat other than a passenger seat of an automobile.

What is claimed is:

1. An airbag for being deployed toward a vehicle occupant, the airbag comprising:
    a first lateral airbag section for being inflated along one side of the vehicle occupant;
    a second lateral airbag section for being inflated along the other side of the vehicle occupant;
    lower facing portions of the first and second lateral airbag sections;
    a gap between the inflated first and second lateral airbag sections adjacent the vehicle occupant; and
    a lower connector for interconnecting the lower facing portions of the first and second lateral airbag sections,
    wherein the first and second lateral airbag sections each have opposite sides with the opposite sides of at least one of the airbag sections having different vertical heights, the airbag sections each have one side facing one side of the other airbag section, and the differing height sides of the one airbag section include the facing side being shorter than the opposite side, and the opposite sides of the one airbag section are each formed by respective panels with the panels having the same height prior to airbag assembly, and the panel of the shorter facing side having a pinched and sewn intermediate height portion thereof to reduce the height thereof.

2. The airbag of claim 1, wherein the lateral airbag sections have vertical heights and the interconnected lower facing portions are below a midpoint along the vertical heights of the lateral airbag sections.

3. The airbag of claim 1, wherein the facing sides include the lower facing portions of the first and second lateral airbag sections; and
    an inflation control member associated with at least one of the first and second lateral airbag sections operable to shift an upper portion along the side opposite the facing side of the one airbag section toward the lower facing portion thereof as the one airbag section is inflated.

4. The airbag of claim 3 wherein the inflation control member comprises a tether in the one airbag section.

5. The airbag of claim 3 further including another inflation control member associated with the other airbag section and being operable to shift an upper portion along the side opposite the facing side of the other airbag section toward the lower facing portion thereof as the other airbag section is inflated.

* * * * *